Davenport & Case,
Wine Press.
No. 111,183. Patented Jan. 24, 1871.

Witnesses:
Phil. T. Dodge
Henry N. Mygatt

Inventors:
G. L. Davenport
C. G. Case
by Dodge & Munn
their attys

United States Patent Office.

GEORGE L. DAVENPORT AND CHARLES G. CASE, OF DAVENPORT, IOWA.

Letters Patent No. 111,183, dated January 24, 1871.

IMPROVEMENT IN WINE-PRESSES.

The Schedule referred to in these Letters Patent and making part of the same.

*To all whom it may concern:*

Be it known that we, GEORGE L. DAVENPORT and CHARLES G. CASE, of Davenport, in the county of Scott and State of Iowa, have invented certain Improvements in Wine-Presses, of which the following is a specification, reference being had to the accompanying drawing.

Our invention relates to a press for making wine from grapes, &c.; and

It consists in the combination and arrangement, in one machine, of certain devices for thrashing the grapes from their stems, separating the stems from the grapes, pressing the juice from the grapes, and separating the seeds and skins from the juice, as hereinafter described.

Figure 1:
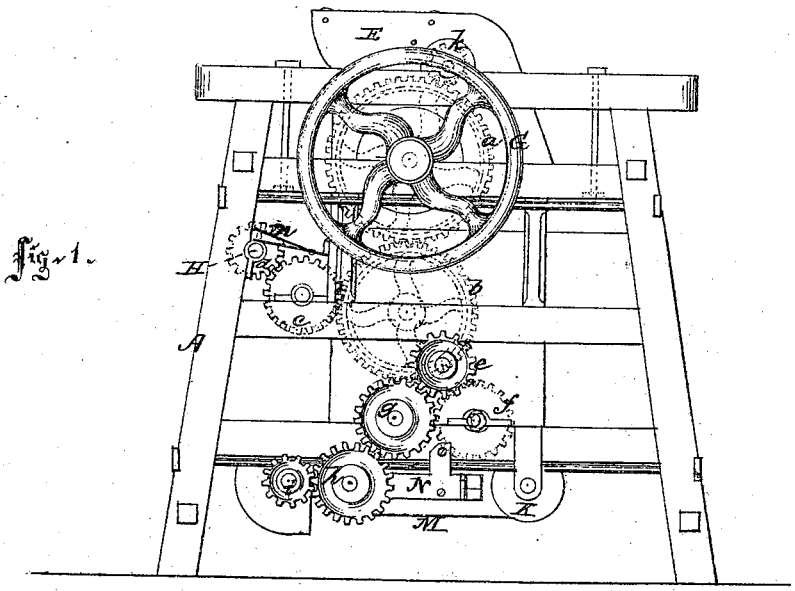

Figure 1 is a side elevation of our press; and

Figure 2:
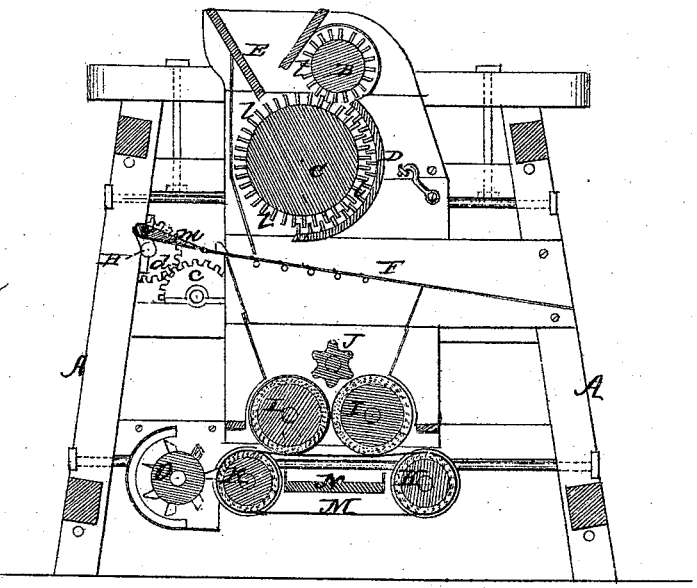

Figure 2, a longitudinal vertical section through the middle of the same.

In constructing our press, we first make a strong upright frame, A, and mount transversely in its upper side a large horizontal cylinder, C, and above this cylinder, and parallel therewith, a smaller cylinder, B, as shown in fig. 2.

The cylinders B C we arm with pins or teeth, $l$, of such length that, when the cylinders are in motion, the teeth of one will pass between the teeth of the other.

Above these cylinders we mount a hopper, E, and behind the cylinder C, mount a concave, D, armed with teeth.

To one end of the shaft of cylinder C we secure a driving-wheel, G, and to the opposite end a cog-wheel, $a$, which meshes into a small pinion, $k$, on cylinder B, as shown in fig. 1.

When the cylinders are put in motion, and the bunches of grapes thrown into the hopper E, the teeth $l$ acting upon them thrash the grapes from their stems, and discharge both the grapes and stems at the lower side of the concave.

For the purpose of separating the stems from the grapes, we mount, below the thrashing-cylinders, an inclined sieve, F, which is supported in guides, and has a reciprocating motion given to it by a crank-shaft, H, and pitman $m$, the manner in which the crank-shaft is driven being hereinafter described.

When the grapes and stems fall from the thrashing-rolls onto this sieve, the grapes fall through, but the stems remain on top, and are worked off at the lower end.

Below the sieve we mount, so as to bear tightly against each other, two parallel horizontal rolls, I, made of cast-iron, and covered with rubber, as shown in fig. 2.

These rolls are for the purpose of pressing the juice from the grapes, and they revolve toward each other. The grapes being fed between them, the skins, seeds, and solid portions are drawn through between the rolls, while the juice flows along between the upper sides, and down over the ends of the same.

Above the press-rolls I we mount a fluted distributing-roll, J, for the purpose of feeding the grapes evenly to the former.

The rolls I we provide with pinions of equal size, meshing into each other, so that the two rolls move together.

The press-rolls are driven by an idle wheel, $b$, interposed between the wheel $a$ of drum C, and the pinion of one of the press-rolls, as shown in fig. 1.

This idle wheel also serves, by means of an intermediate pinion, $c$, to drive the pinion $d$ of the crank-shaft H.

The feed-roll J is driven by a pinion, $e$, on its back end, which meshes into a gear-wheel, $g$, on the back end of one of the press-rolls I, as shown in fig. 1.

Below the press-rolls, at some distance apart, we mount two parallel rolls K, and mount thereon an endless apron, M, of wire-cloth, to receive and carry off the skins, seeds, &c., discharged between the press-rolls.

By the side of one of the rolls K we mount a shaft, O, provided with a series of brushes, which latter, as the shaft revolves, act upon the face of the apron, and serve to brush the adhering particles therefrom.

One of the rolls K we provide with a pinion, $h$, which is operated by a pinion, $g$, on the presser-roll, and which in turn meshes into and drives a pinion, $i$, on the brush-shaft, as shown in fig. 1.

Across the frame, between the rolls K, and inside of or through the apron M, we mount an inclined trough, N, which extends out past the sides of the apron, and up opposite the ends of the press-rolls I, as shown in fig. 2.

The juice as it is pressed from the grapes and flows down over the ends of the rolls, is caught in the trough N, and flows down to the lower end of the same, where it is discharged pure and clear.

It is obvious that our press can be used for treating currants by using a sieve, F, of the proper fineness for separating the stems from the fruit, and also for pressing other varieties of fruits and berries.

In this manner we produce a cheap and portable press, by which the grapes are automatically carried through the several necessary operations without the necessity of rehandling them at each stage, as has heretofore been necessary.

Having thus described our invention,

What we claim is—

1. In a wine-press, the thrashing mechanism, consisting of the cylinders B and C, and concave D, armed with teeth, and constructed and arranged to operate substantially as herein described.

2. In a wine-press, the separating mechanism, consisting of the inclined sieve F, with its pitman and crank-shaft, when constructed and arranged to operate substantially as herein described.

3. In a wine-press, the combination of the rubber-covered rollers I I with the fluted distributing-roll J, when constructed and arranged to operate substantially as herein described, and for the purpose set forth.

4. In connection with the rollers I I and J, the endless apron M, and the brushes O, when said parts are arranged substantially as and for the purpose set forth.

GEO. L. DAVENPORT.

Witnesses:
CHARLES G. CASE.
L. A. LE CLAIRE,
W. L. CARROLL.